Sept. 7, 1943. J. D. LUEBKEMAN 2,328,819
HOSE COUPLING
Filed Feb. 14, 1942
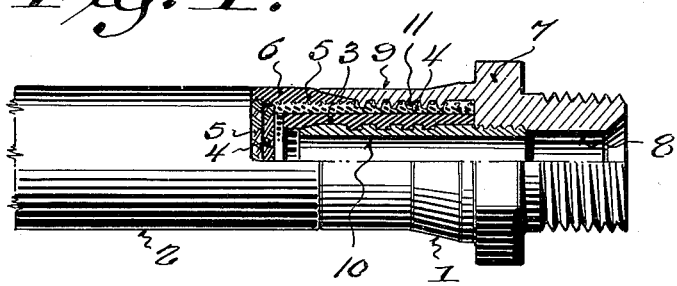
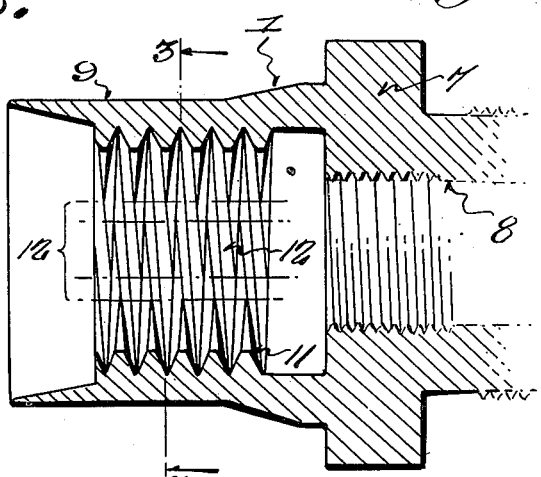
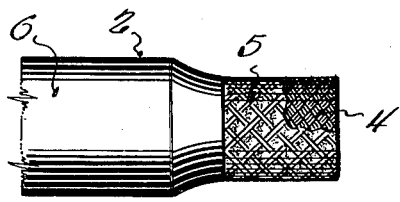
Inventor:
J. D. Luebkeman Patented Sept. 7, 1943

2,328,819

UNITED STATES PATENT OFFICE 2,328,819

HOSE COUPLING

John D. Luebkeman, Detroit, Mich.

Application February 14, 1942, Serial No. 430,916

3 Claims. (Cl. 285—84)

This invention pertains to hose couplings, and more particularly to couplings designed for permanent attachment to the ends of high-pressure rubber hose.

I am aware that the present art is highly developed, and therefore my invention is not directed broadly to a specific type of coupling, nor a method of attachment, but rather to means applicable to conventional couplings for increasing their clamping effectiveness to further insure against leakage or blow-off.

Primarily the present invention contemplates forming the internal gripping surface of the coupling in such manner as to present a maximum number of annularly interrupted gripping projections, between which the exposed surfaces of the hose may flow when the coupling is clamped thereon, thus allowing the projections to more effectively embed themselves into the exposed surfaces of the hose.

Incidental to the foregoing, a more specific object of the invention is to provide the inner gripping surface of a coupling with right and left hand intersecting threads.

A further object of the invention, with reference to couplings applied to prepared ends of reinforced hose, is to conform the inner gripping projections or threads to the weave of the reinforcing fabric to prevent undue distortion or mutilation of the fabric.

A still further object resides in facilitating the withdrawal of the hose from the coupling, as well as its insertion, by means of right and left hand threads formed in the sleeve.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:

Figure 1 illustrates a section of hose to which a coupling constructed in accordance with one form of the present invention is attached, a portion of the hose and coupling being shown in section;

Figure 2 is an enlarged fragmentary sectional view of the coupling and sleeve removed from the hose to better illustrate the internal gripping threads.

Figure 3 is a half transverse sectional view taken on the line 3—3 of Figure 2; and Figure 4 is an elevational view of the prepared end of a conventional hose reinforced with both fibre and metal mesh.

Referring now more particularly to the accompanying drawing, a conventional type of coupling designated by the numeral 1 is shown attached to the end of a standard type of hose 2.

As best shown in Figures 1 and 3, the hose 2 comprises an inner core 3 of flexible rubber or similar material surrounded by a woven metallic mesh 4. Wound over the mesh 4 is layer 5 of woven fibrous cord, which in turn is covered by an outer rubber casing 6.

As stated, hose of the foregoing type is quite old in the art and forms no part of the present invention, other than in the combination hereinafter claimed, inasmuch as it is contemplated that the fundamental principle of the invention may be applied to all types of non-metallic hose.

The coupling 1 consists of a head 7 provided with a reduced threaded end for attachment to another coupling, or piece of equipment, and having a central bore 8. A sleeve 9 extends rearwardly from the head, and a nipple 10 is threaded into the central bore 8 for insertion into the end of the hose.

Heretofore, it has been common practice to provide the inner surface of the coupling sleeve 9 with a single thread or longitudinally spaced annular projections, which in all instances have been continuous, and therefore fail to effectively grip and embed themselves into the hose to the extent of preventing leakage or blow-off.

As stated in the foregoing objects, the salient feature of the present invention is to form the inner surface of the coupling sleeve in such manner that maximum gripping of the hose is obtained. This is accomplished primarily by interrupting, or annularly spacing the projections or threads, to permit greater flow of the hose between the projections when the coupling is clamped upon the hose, and consequently increase embedding of the projections into the exposed surface of the hose.

While the foregoing may be accomplished in several ways, the preferred form of the invention consists in the provision of right and left hand intersecting threads 11 formed on the inner surface of the sleeve 9, as best shown in Figure 2, which results in forming annular interruptions 12.

Obviously the interruptions 12 provide additional spaces to receive the flow of material from the hose and consequently allow increased embedding of the threads into the hose when the sleeve is clamped upon the same by means of a die, or in other suitable manner now employed.

It will be noted further that the interrupted ends of the threads provide added resistance against twisting or turning of the coupling on the hose.

Another advantage derived from the use of right and left hand intersecting threads, results from the fact that, prior to reducing or clamping the sleeve upon the end of the hose one of the threads will serve to facilitate insertion of the hose, which is usually turned into the sleeve, while the other thread will aid in removal, which is frequently required due to improper insertion.

Although other types of annularly spaced or interrupted projections may be formed in the sleeve by the process of casting or forging, use of right and left hand intersecting threads is particularly preferable in that the same can be formed by simple and inexpensive machine operations.

The coupling illustrated is designed particularly for the prepared end of a hose having either fibrous or metallic reinforcement, or both. As best shown in Figure 4, the outer casing 6 is stripped or cut away from the end of the hose to expose the woven fibrous threads 5, which cover the woven metallic mesh 4. In most instances the common practice is to also remove the fabric 5 to expose the metallic reinforcement, naturally this requires an extra tedious manual operation which is usually accomplished by means of a wire brush. However it has been found that by use of the present invention the necessity and expense of removing the fabric 5 is unnecessary, inasmuch as the interruptions in the clamping projections provide added spaces which allow the fabric 5 to flow, thus permitting the projections or threads to securely embed themselves into the metallic reinforcement.

For use upon the stripped ends of hose provided with woven wire reinforcement, such as disclosed in Figure 4, it is contemplated that the pitch of the right and left hand gripping threads provided in the coupling sleeve may be made to conform to the angle of the diagonal strands, for the purpose of avoiding spreading or undue mutilation of the strands.

Furthermore, in certain types of couplings ductile or collapsible clamping rings are inserted into the coupling sleeve for gripping the exposed surface of the hose, and it is proposed in such event to provide the inner surface of the ring insert with projections of the character comprising the present invention.

Also it will be understood that the invention is applicable to those types of couplings in which the hose is expanded by means of the insert, either with or without compression of the coupling sleeve.

From the foregoing explanation considered in connection with the accompanying drawing it will be apparent that exceedingly simple and inexpensive provision has been made for increasing the gripping effectiveness of a coupling sleeve on the hose, which at the same time prevents twisting of the coupling on the hose, thus affording maximum insurance against leakage or blow-off.

As stated, the advantages derived from the present invention are equally important when applied to hose having only fibrous reinforcement or none at all, and in every instance insertion or removal of the hose from the coupling is facilitated.

While old in the art, it will be understood that in couplings of the present type the sleeve 9 is normally expanded to allow more or less free insertion of the hose by turning the same into the sleeve, after which the sleeve is reduced by means of clamps or dies to embed the inner projections into the hose as best shown in Figure 1.

Having thus described one form of my invention in considerable detail it is to be understood that changes in the precise embodiment are contemplated within the following claims.

I claim:

1. A hose coupling of the type described comprising, a head having a contractible sleeve for reception of the end of a non-metallic flexible hose, and annularly spaced clamping projections formed on the inner surface of the sleeve for protruding into the surface of the hose to securely grip the same when the sleeve is contracted.

2. A hose coupling of the type described comprising, a head having a contractible sleeve for reception of the end of a non-metallic flexible hose, and right and left hand intersecting threads associated with the interior of the sleeve for protrusion into the surface of the hose to securely grip the same when the sleeve is contracted.

3. In combination with a non-metallic flexible hose provided with a woven wire reinforcement and having the end of its cover cut away to expose a portion of said reinforcement; a coupling comprising, a head having a contractible sleeve for reception of the end of said hose, and right and left hand intersecting threads associated with said sleeve and conforming to the angles of said woven wire strands.

JOHN D. LUEBKEMAN.